(12) United States Patent
Krogager et al.

(10) Patent No.: US 8,221,575 B2
(45) Date of Patent: Jul. 17, 2012

(54) AUTOMATIC TAPE LAYING APPARATUS AND METHOD

(75) Inventors: Max Krogager, Linköping (SE); Björn Weidmann, Borensberg (SE); Mikael Petersson, Linköping (SE)

(73) Assignee: SAAB AB, Linköping (SE)

( * ) Notice: Subject to any disclaimer, the term of this patent is extended or adjusted under 35 U.S.C. 154(b) by 141 days.

(21) Appl. No.: 11/422,885

(22) Filed: Jun. 8, 2006

(65) Prior Publication Data

US 2006/0289111 A1 Dec. 28, 2006

(30) Foreign Application Priority Data

Jun. 8, 2005 (EP) ..................................... 05105016

(51) Int. Cl.
*B32B 37/00* (2006.01)
*B32B 38/00* (2006.01)
*B32B 38/04* (2006.01)

(52) U.S. Cl. ........ 156/271; 156/250; 156/252; 156/256; 156/259; 156/265; 156/268; 156/269; 156/270

(58) Field of Classification Search .................. 156/252, 156/265, 510, 517, 250, 259, 268–271; 225/93
See application file for complete search history.

(56) References Cited

U.S. PATENT DOCUMENTS

| | | | |
|---|---|---|---|
| 3,810,805 A * | 5/1974 | Goldsworthy et al. ....... | 156/361 |
| 4,351,688 A | 9/1982 | Weiss et al. | |
| 4,519,285 A | 5/1985 | Dontscheff et al. | |
| 4,557,783 A | 12/1985 | Grone et al. | |
| 5,045,147 A * | 9/1991 | Benson et al. ................. | 156/429 |
| 5,375,782 A * | 12/1994 | Schwelling .................... | 241/166 |
| 5,472,553 A * | 12/1995 | Roberts .......................... | 156/353 |
| 5,480,508 A * | 1/1996 | Manabe et al. ................ | 156/353 |
| 5,934,580 A * | 8/1999 | Maier et al. .................... | 241/100 |
| 6,454,893 B1 | 9/2002 | McKague, Jr. | |
| 2002/0113108 A1 * | 8/2002 | Jackson ............................ | 225/2 |

FOREIGN PATENT DOCUMENTS

| | | |
|---|---|---|
| FR | 2539122 | 7/1984 |
| FR | 2633213 | 12/1989 |

OTHER PUBLICATIONS

European Office Action, dated Jul. 4, 2007, issued in connection with counterpart European Patent Application No. 05 105 016.9.
European Office Action, dated Nov. 2, 2007, issued in connection with counterpart European Patent Application No. 05 105 016.9.

* cited by examiner

*Primary Examiner* — Mark A Osele
*Assistant Examiner* — Christopher C Caillouet
(74) *Attorney, Agent, or Firm* — Venable LLP; Eric J. Franklin

(57) ABSTRACT

A method for manufacturing a contoured composite article. A separation distance of dividing elements of a dividing unit configured to divide a tape comprising fiber is adjusted. The tape is fed through the dividing unit to divide the tape into a plurality of inter-connected or separate, substantially longitudinal strips. The tape is laid onto a surface with an automatic tape laying apparatus.

7 Claims, 2 Drawing Sheets

AUTOMATIC TAPE LAYING APPARATUS AND METHOD

TECHNICAL FIELD OF THE INVENTION AND PRIOR ART

The present invention concerns a method involving an automatic tape laying (ATL-) apparatus for laying tape containing fibre onto a surface, such as the surface of a shaped tool, to form a composite article.

In the ATL-process one or more layers of fibre-reinforced tape with a width of 50 to 300 mm is laid over a shaped tool and cured to form a rigid composite article. Unidirectional pre-impregnated tape, such as carbon fibre impregnated with thermoset resin, is typically supplied in roll form on backing papers and loaded onto a tape laying head. The tape laying head is usually mounted on a gantry that positions the tape laying head over and onto flat or contoured tools for lay up. A typical composite article consists of several plies of tape laid up at various ply angles. A "ply" consists of one layer of tape courses oriented at a given angle. Plies are laid on top of one another to create a laminate.

When manufacturing contoured laminates, the plies are laid on the contoured surface of a tool and the laminate and tool are then transferred to an autoclave for curing.

Conventionally automatic tape laying is used to manufacture large articles with flat or gently curving surfaces since difficulties arise when articles having a complex geometrical form are to be produced. In the manufacture of highly curved or contoured articles the tape tends to buckle and bridge at plane transitions and fibres of the tape become twisted if the tape is bent to follow the curvature of a contoured tool.

SUMMARY OF THE INVENTION

The object of the present invention is to provide a fast and effective method for laying tape containing fibre onto a surface, such as the surface of a shaped tool, to form a composite article of any desired size, shape or structure.

This object is fulfilled by a method using an ATL-apparatus that comprises means to divide the tape into a plurality of inter-connected or separate, substantially longitudinal strips before the tape is laid onto the surface. The expression "substantially longitudinal" is intended to mean strips that extend along the length of the tape either parallel to a side of the tape or the tape dispensing direction or at an angle, thereto i.e. from 0-10.degree.

The dividing means is arranged to divide the tape into strips that extend in the tape's fibre orientation direction if the tape comprises uni-directional continuous or chopped fibres. Alternatively if the tape comprises randomly oriented chopped fibre the tape is divided into strips that extend in a direction with respect to a side of the tape or the tape dispensing direction, such as 10.degree. with respect to the tape dispensing direction.

A divided tape can be made to follow the intricate curvature of a contoured component precisely without the tape twisting, buckling or bridging. The divided tape will be able to bend or move sideways and consequently adapt to a contoured surface, which is difficult and sometimes impossible using tape whose width is greater than the dimensions of the contours of the surface onto which it is laid. The strips may therefore be positioned to ensure that the user's design criteria, including fibre-orientation specifications, are achieved. High quality, high strength articles with a high structural integrity may therefore be manufactured quickly and cost-effectively. Furthermore fibre angles can be optimised and the weight of the finished article may be reduced by up to 40%.

Said dividing means comprises at least one projection that is arranged to cut, perforate or score the tape. The width of said at least one projection is arranged to determine the spacing, d, between inter-connected strips i.e. in the case of tape comprising continuous fibre, the tape will be provided with at least one region, of width d, which is substantially free of fibre.

The configuration of the dividing means, i.e. its structure and longitudinal and lateral dimensions as well as the size and orientation of any projections, is fixed or adjustable. The dimensions of the projections may for example be adjusted to suit different applications in-between tape-laying runs or during the operation of the ATL-apparatus. The dividing means may substantially cover the entire width of the tape or could be arranged to affect any particular part or parts of the tape. The longitudinal extension of the dividing means in the tape-laying direction may also be fixed or variable.

Said dividing means can be a toothed device, such as a comb. Two or more toothed devices may be arranged in succession across the tape's width or along the tape's length.

Said dividing means can be movable, rotatable, expandable and/or contractable in any direction across the width or length of the tape.

The dividing means can be arranged to divide the tape into a plurality of strips of the same width or of different widths. The width of the strips may therefore be chosen to optimally follow the contours of the surface on which it is laid.

The dividing means may be located where the tape is fed into a laying unit of the ATL-apparatus.

Said tape can be a pre-impregnated tape comprising fibres impregnated with a thermoplastic resin for example.

The present invention concerns a method for manufacturing a contoured composite article. The method comprises the step of laying a tape containing fibre onto a surface using an automatic tape laying (ATL-) apparatus. The method further comprises the step of feeding said tape through means to divide the tape into a plurality of inter-connected or separate, substantially longitudinal strips before the tape is laid onto the surface. Such a method allows highly contoured articles, such as a C-shaped aircraft component, to be manufactured quickly and accurately thus decreasing the component cost.

According to an embodiment of the invention the method comprises the step of cutting, perforating or scoring the tape. According to another embodiment of the invention the method comprises the step of dividing the tape into strips that extend in the tape's fibre orientation direction. According to a further embodiment of the invention the method comprises the step of dividing the tape into a plurality of strips of the same width or of different widths. According to a yet further embodiment of the invention the method comprises the step of dividing the tape just before the tape enters the laying unit of the ATL-apparatus.

A dividing means for an ATL-apparatus for laying tape containing fibre onto a surface to form a composite article comprises at least one projection to divide the tape into a plurality of inter-connected or separate, substantially longitudinal strips of the same width or of different widths by cutting, perforating or scoring the tape before the tape is laid onto the surface.

The method according to any of the embodiments of the invention are intended for use, particularly but not exclusively to manufacture a contoured composite article for the aerospace or automobile industry, for use in construction, in armoured clothing, such as a bullet-proof vest, or a recreational item.

Further advantages as well as advantageous features of the invention appear from the following description and the other dependent claims.

It should be noted that the figure is not drawn to scale and that the size of certain features has been exaggerated for the sake of clarity.

The following description and drawing are not intended to limit the present invention to the embodiment disclosed. The embodiment disclosed merely exemplifies the principles of the present invention.

DETAILED DESCRIPTION OF AN EMBODIMENT OF THE INVENTION

Figure 1:
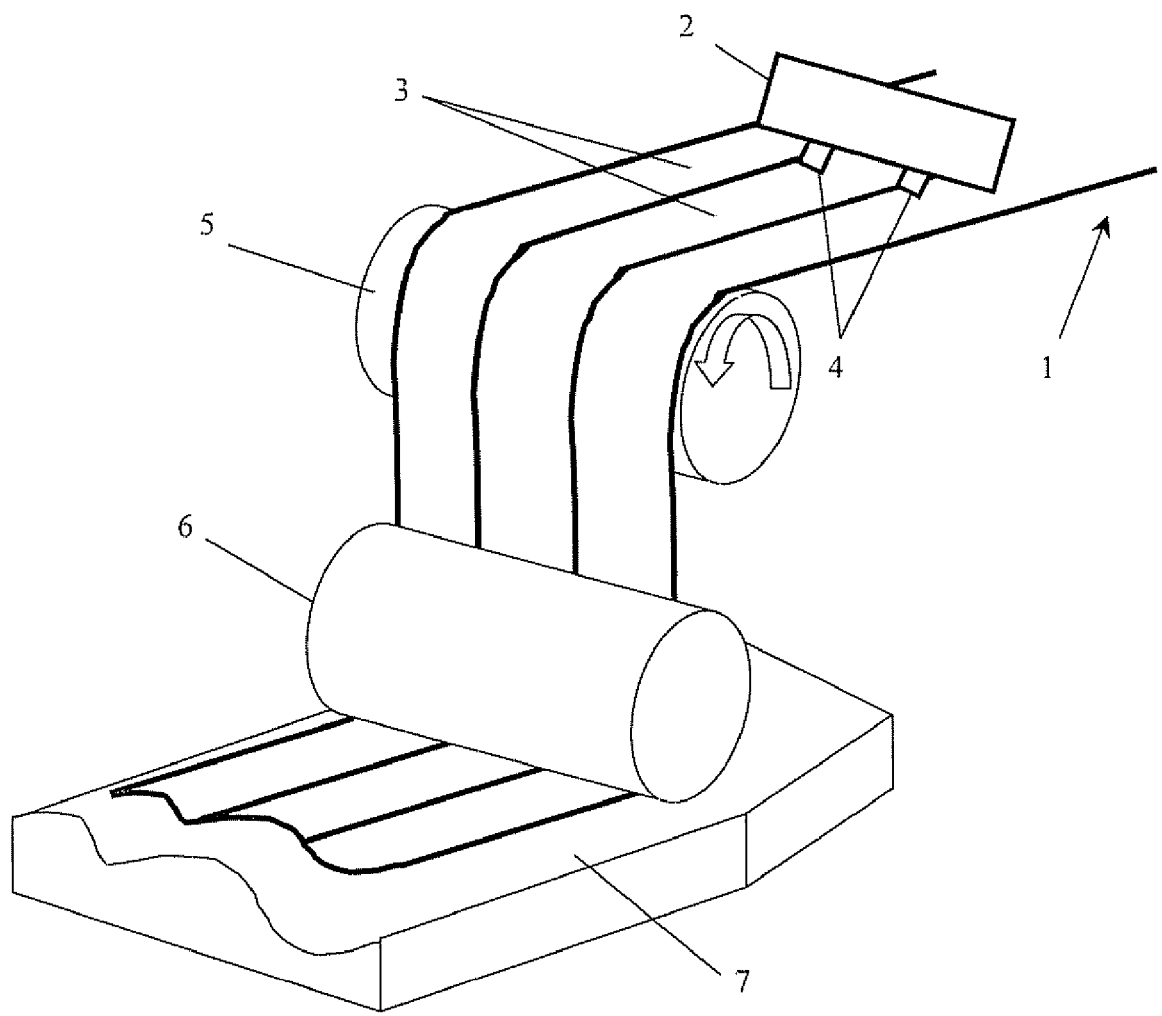
FIG. 1 shows an ATL-apparatus illustrative of the invention.

FIG. 1 shows an epoxy resin-impregnated fibre tape 1 from a roll (not shown) passing through an ATL-apparatus. The tape 1 comprises uni-directional, continuous fibre aligned in the tape-dispensing direction. The fibre comprises at least one of the following; carbon, glass, high-modulus polyethylene, boron, steel or any other metal, Kevlar, quartz, ceramic or a combination thereof.

The tape 1 passes through means 2 to divide the tape 1 into a plurality of inter-connected substantially longitudinal strips 3. Said means 2 comprises a plurality of projections 4 that are arranged to cut, perforate or score the tape. The width of the projections 4 is arranged to determine the spacing between inter-connected the strips. Said means 2 comprises for example a comb whose teeth scrape over the tape to form slits in the tape 1.

Said means 2, or part of said means 2, may be raised from the tape if no strips 3 are required over a particular section of tape 1. The tape 1 is therefore divided into a plurality of longitudinal strips 3 of the desired width. These strips 3 are then led, via a guiding roller 5 to a roller 6 that presses or winds the tape 2 onto the contoured surface 7 of a tool. The strips 3 of tape 1 adapt to the contoured tool surface 7. If the tape 1 were not divided into more narrow strips 3, the tape would not be able to move sideways in order to adapt to the contoured tool surface 7 and a good fit between the tape 1 and the surface 7 would not be obtained.

The original width of the tape 1 may for example be 300 mm and the tape may then be divided into ten inter-connected or separate strips 3 with a width of 30 mm. In FIG. 1 the strips 3 are exemplified as having the same width. The tape 1 could however be divided into strips 3 of different widths to better conform to the contours of a surface. For example a surface could comprise a flat region and a curved region whereby a single wide strip 3 could be laid on the flat region whereas a plurality of more narrow strips 3 could be laid on the curved region of the surface.

FIGS. 2a-2d show a comb more in detail. The teeth 10 of the comb 12 are arranged in such way that during application, the teeth 10 scrape over a tape 1, comprising fibres 13 oriented in a direction corresponding with the longitudinal direction of the tape 1, forming slits 14 in the tape 1 (see FIGS. 2c and 2d). The teeth are round (not sharp) for dividing the tape 1 into five strips 3. The rounded tips 16 of the teeth 10 perform a separating tension of the fibres 13 keeping the fibres 13 intact and divide the tape 1 into said strips 3. In such way the finished product will have a high strength, since the fibres of the tape are maintained intact.

Figure 2A:
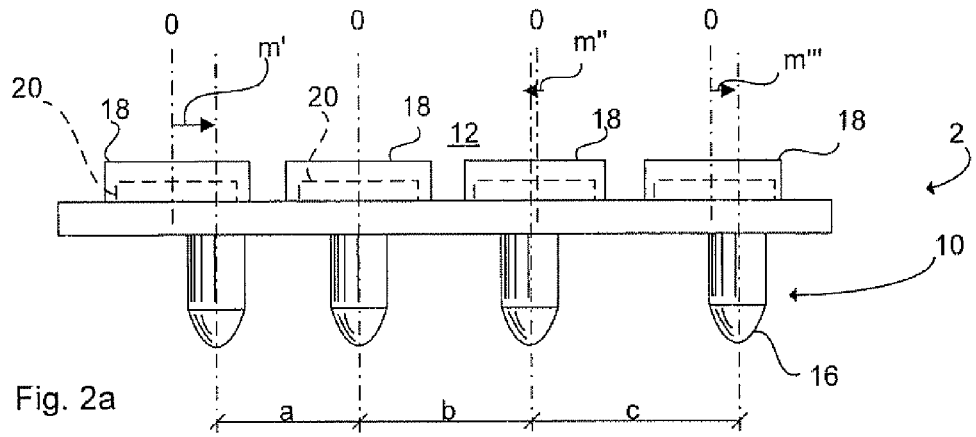
FIGS. 2a-2d show an ATL-apparatus illustrative of the invention.

In the embodiment shown in FIG. 2a, distances a, b, c between the teeth 10 are adjusted by means of an adjustment mechanism 18 comprising elements 20 (such as electric motors coupled to a control panel, not shown) for moving each tooth 10 into a predetermined position relative to the others. The distances are determined from the tape curvature or bend to be achieved for matching the intricate curvature of the finished component. The displacement of the teeth 10 is performed in relation to the centre line 0 of the mechanism 18 defining the distance m', m", m''' etc.

Figure 2B:
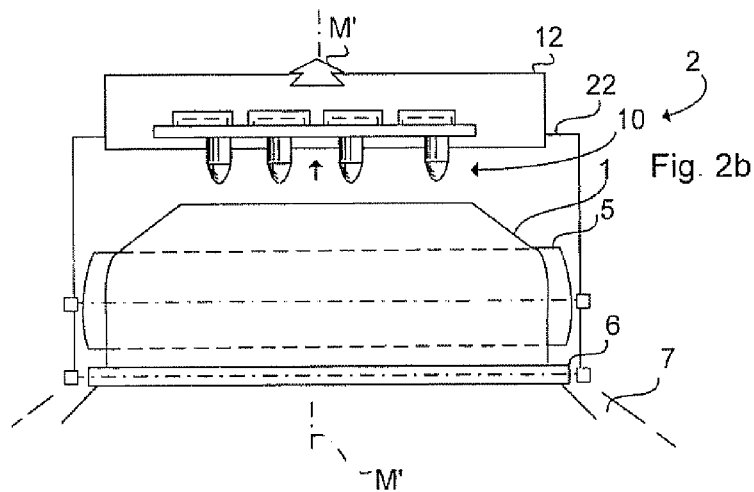

The ATL-apparatus (identified with the reference sign 20) is arranged with a raising/lowering mechanism 22 for raising or lowering the comb 12 relative the tape 1. In FIG. 2b the comb 12 is raised from the tape 1 for not influencing the tape 1 to be laid onto the surface 7'. This is a mode for laying the tape 1 linearly (in a direction M') onto the surface 7'. The ATL-apparatus can easily further be adjusted for laying the same tape 1 onto a contoured surface 7' by lowering the comb 12 by means of the raising/lowering mechanism 22, thereby dividing the tape 1 into said strips 3 (a control is made for moving the comb 12 along a curved direction M") as being shown, achieving a curved fibre direction without the tape twisting, buckling or bridging. The achieved divided tape will be able to bend or move sideways and can be adapted to a contoured surface 7' in an efficient manner. A holding-up plate 24 is also moved towards the underside of the tape within the area of the comb 12 for holding against the comb 12.

Figure 2D:
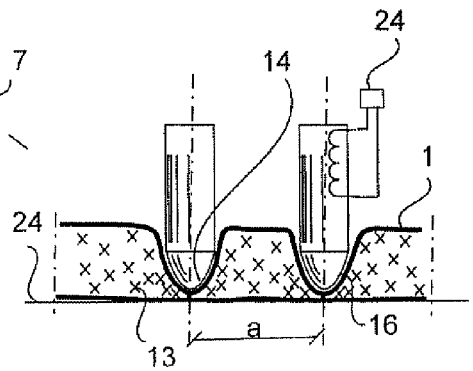
Figure 2C:
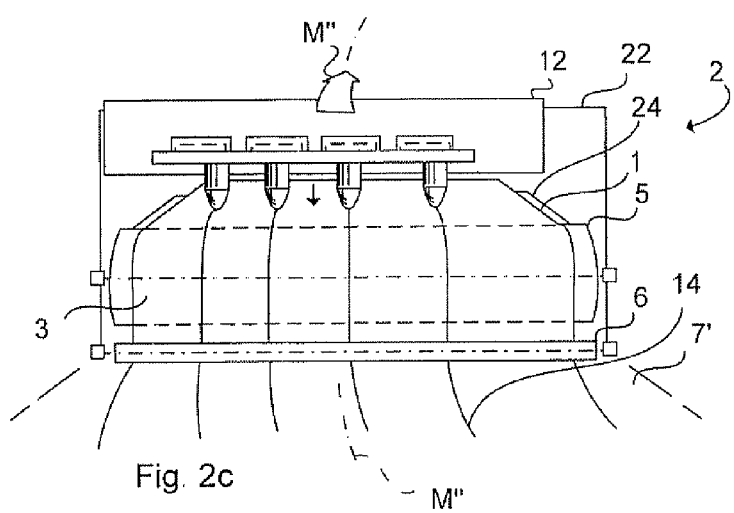

In FIG. 2d is shown even more closely the tip 16 of the tooth 10 dividing the prepreg-tape having fibres 13 oriented in the longitudinal direction of the tape 1 (simply shown by a plurality of cross indicating the cross section of each fibre). It is clear from the FIG. 2d that the tooth 10 performs a separating tension of the fibres 13 separating the fibres 13 from each other and keeping the fibres 13 intact and divide the tape 1 into the strips 3. Thus, the resin/plastic of the tape 1 will be divided by the comb 12. Alternatively, the comb 12 is provided with a heating means 24 for soften the resin/plastic, thereby facilitating the dividing procedure of the resin.

One or more layers of tape may be laid on the tool surface 7 to form a laminate. In a laminated structure the angular orientation of the fibres in each layer may be the same or varied. Once sufficient tape 1 has been applied to the tool surface 7, excess material is cut off by a mechanical or ultrasonic cutter, a laser or a water jet for example. The laminate and the contoured tool are then cured in an autoclave to manufacture a component such as a part of a fuselage or a nose cone of an aircraft.

If the tape 1 comprises a backing paper this may be removed from the impregnated fibre, by means of a mechanical wedge for example, at any stage prior to feeding the paper to the roller 6.

The invention is of course not in any way restricted to the embodiments thereof described above, but many possibilities to modifications thereof would be apparent to a man with ordinary skill in the art without departing from the basic idea of the invention as defined in the appended claims.

The invention claimed is:

1. A method for manufacturing a contoured composite article, the method comprising:

adjusting a separation of dividing elements of a dividing unit configured to cut, perforate or score a tape comprising fiber into strips having a same or different widths, wherein adjusting the separation of the dividing elements determines the width of the strips such that the widths of the strips are adapted to optimally follow contours of a surface of a tool on which the strips are laid, wherein the dividing unit comprises a toothed device, and wherein the dividing elements comprise a plurality of teeth having rounded tips;

feeding said tape through the dividing unit to divide the tape with the teeth into a plurality of inter-connected or separate, substantially longitudinal strips, such that the teeth scrape over the tape to perform a separating tension of the fibers to separate the fibers from each other while keeping the fibers intact simultaneously with cutting, perforating or scoring the tape into a plurality of strips; and transferring the tape from the dividing unit directly to an automatic tape laying apparatus and onto the contours of the surface of the tool.

2. The method according to claim 1, further comprising: cutting, perforating or scoring the tape.

3. The method according to claim 1, further comprising: dividing the tape into strips that extend in a fiber orientation direction of the tape.

4. The method according to claim 1, further comprising: dividing the tape just before the tape enters the laying unit of the automatic tape laying apparatus.

5. The method according to claim 1, further comprising: manufacturing a contoured composite article for the aerospace or automobile industry, for use in construction, in armoured clothing or a recreational item.

6. The method according to claim 1, wherein the width of the strips is adjusted such that the strips will follow contours of the surface without twisting, buckling or bridging.

7. The method according to claim 1, wherein the teeth extend transverse to a direction of travel of the tape.

* * * * *